United States Patent

Mueller et al.

[15] 3,691,149

[45] Sept. 12, 1972

[54] DISAZO PIGMENTS

[72] Inventors: Willy Mueller; Karl Ronco, both of Riehen; Rudolf Mory, Dornach, all of Switzerland

[73] Assignee: Ciba-Geigy AG, Basel, Switzerland

[22] Filed: April 9, 1970

[21] Appl. No.: 27,102

[30] Foreign Application Priority Data

April 25, 1969 Switzerland................6360/69

[52] U.S. Cl. ..................260/174, 260/184, 260/188, 260/471 R

[51] Int. Cl.......................C07c 107/08, C09b 43/12

[58] Field of Search...............260/174, 184, 178, 188

[56] References Cited

UNITED STATES PATENTS 2,181,057  11/1939  Krzikalla et al............260/184
3,262,925  7/1966  Mueller et al..........260/184 X

*Primary Examiner*—Joseph Rebold
*Assistant Examiner*—C. F. Warren
*Attorney*—Harry Goldsmith, Joseph G. Kolodny and Mario A. Monaco

[57]  ABSTRACT

Disazo dyestuffs of the formula $R_1-N=N-R_2-CONH-R_3-NHOC-R_2-N=N-R_1$, in which $R_1$ represents an aryl residue, $R_2$ represents a hydroxynaphthalene residue in which the azo, hydroxy and —CO groups are in 1, 2, 3-position, or the residue of an enolized or enolizable ketomethylene compound and $R_3$ represents a phenylene or diphenylene residue containing at least one carboxylic acid ester, carboxylic acid amide, sulphonic acid ester, sulphonic acid amide or sulphone group are valuable pigments which are useful for coloring plastics and lacquers in yellow to red shades.

9 Claims, No Drawings

DISAZO PIGMENTS

This invention is based on the observation that new and valuable disazo pigments of the formula

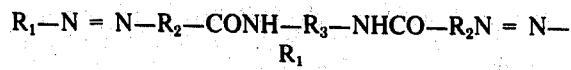

in which $R_1$ represents an aryl residue, $R_2$ represents a hydroxynaphthalene residue in which the azo, hydroxy and —CO groups are in 1, 2, 3-position or the residue of an enolized or enolizable ketomethylene compound and $R_3$ represents a phenylene or diphenylene residue containing at least one carboxylic acid ester, carboxylic acid amide, sulphonic acid ester, sulphonic acid amide or sulphone group, may be obtained by condensing an azo dyestuff carboxylic acid halide of the formula

with a diamine of the formula

in a molar ratio of 2:1.

Since the products of the invention are pigments, they must not contain groups imparting solubility in water, especially acidic groups imparting solubility in water.

Pigments that are of special interest are those of the formula

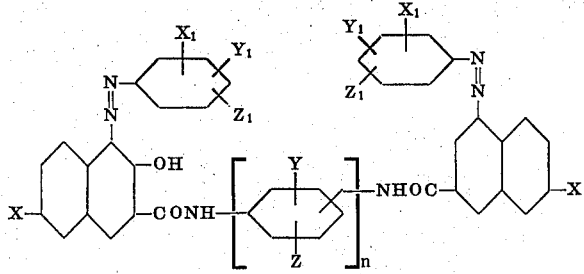

in which $X_1$ and $Y_1$ each represents a hydrogen or a halogen atom or an alkyl, alkoxy, phenoxy, nitro, cyano, carboxylic acid ester, acylamino, sulphone or trifluoromethyl group, $Z_1$ represents a hydrogen or a halogen atom or an alkyl, alkoxy or carboxylic acid amide group, X represents a hydrogen or a halogen atom or an alkoxy, cyano or nitro group, Y represents a carboxylic acid ester, carboxylic acid amide, sulphonic acid ester, sulphonic acid amide or sulphone group, Z represents a hydrogen or a halogen atom or an alkyl, alkoxy or phenoxy group, and $n = 1$ or 2, and particularly those of the formula

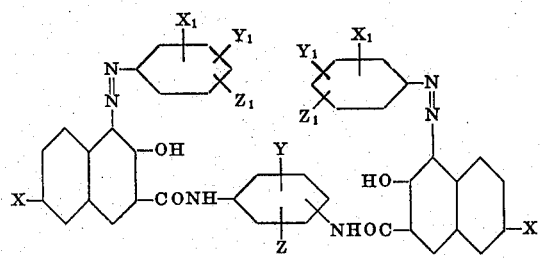

in which $X_1$, $Y_1$, $Z_1$, X and Y have the meanings given above, and particularly $X_1$ and $Y_1$ each represents hydrogen, chloro, bromo, lower alkyl, lower alkoxy, phenoxy, chlorophenoxy, loweralkyl phenoxy, nitro, cyano, lower carbalkoxy, carbophenoxy, carbo-chlorophenoxy, carbo-lower alkyl-phenoxy, carbo-naphthoxy, lower alkyl-sulfonyl, or trifluoromethyl, $Z_1$ is hydrogen, chloro, bromo, lower alkyl, or lower alkoxy, X represents hydrogen, bromo, lower alkoxy, cyano or nitro, Y is lower carbalkoxy, carbophenoxy, carbo-chlorophenoxy, carbo-lower alkylphenoxy, carbonaphthoxy, sulfonic acid-lower alkyl ester, carboxylic acid amide, carboxylic acid-lower-alkyl amide, carboxylic acid-phenyl-amide, carboxylic acid-chlorophenyl amide, carboxylic acid-lower alkyl-phenyl amide, carboxylic acid-trifluoromethylphenyl amide, sulfonic acid amide, sulfonic acid-lower alkyl amide, sulfonic acid-phenyl-amide, sulfonic acid-chloro-phenyl amide, sulfonic acid-lower alkyl-phenyl amide, or lower alkyl sulfonyl, Z is hydrogen, chloro, lower alkyl or lower alkoxy or those of the formula

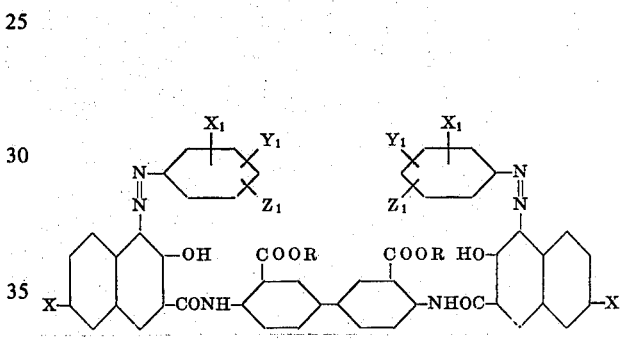

in which X, $X_1$, $Y_1$ and $Z_1$ have the meanings given above and R represents an alkyl group.

The carboxylic acids from which the carboxylic acid halides are derived may be obtained by coupling a diazo compound of an amine, especially an arylamine, for example, an aminobenzene or an aminonaphthalene, with a 2,3-hydroxynaphthalene carboxylic acid. The following amines are given as examples of such diazo components: aniline, 2-, 3- or 4-chloroaniline, 3,4-dichloroaniline, 2,3-dichloroaniline, 2,4-dichloroaniline, 2,5-dichloroaniline, 2,6-dichloroaniline, 2,4,5-trichloroaniline, 2,4,6-trichloroaniline, 2-, 3- or 4-bromoaniline, 2,4-dibromoaniline, 2,5-dibromoaniline, 2-, 3- or 4-methylaniline, 2,4-dimethylaniline, 2,5-dimethylaniline, 2-methyl-5-chloroaniline, 2-methyl-4-chloroaniline, 2-methyl-3-chloroaniline, 2-chloro-5-trifluoromethylaniline, 2-, 3- or 4-nitroaniline, 2,4-dinitroaniline, 3-trifluoromethylaniline, 3,5-bis-trifluoromethylaniline, 2-chloro-5-trifluoromethylaniline, 4-chloro-2-nitroaniline, 2-chloro-4-nitroaniline, 4-methyl-2-nitroaniline, 4-methyl-3-nitroaniline, 2,4-dimethyl-3-nitroaniline, 2-methyl-5-nitroaniline, 2-ethyl-5-nitroaniline, 2-methyl-4-nitroaniline, 2-nitro-4-trifluoromethylaniline, 4- nitro-2-trifluoromethylaniline, 2- and 4-methoxyaniline, 3-chloro-4-methoxyaniline, 2-nitro-4-methoxyaniline, 2-nitro-4-ethoxyaniline, 2-methoxy-5-nitroaniline, 2-methoxy-5-chloroaniline, 2,5-dimethoxy-4-chloroaniline, 2-methoxy-5-benzylsulphonylaniline, 2-methoxy-5-trifluoromethylaniline, 2-ethylsulphonyl-5-trifluoromethylaniline, 2-amino-4-trifluoromethyl-4'-chlorodiphenylether, 2-amino-4-trifluoromethyldiphenylether, 2-amino-4-chlorodiphenylether, 2-amino-2'-dichlorodiphenylether, 2-amino-4,4'-dichlorodiphenylether, 1-aminobenzene-2-carboxylic acid methyl ester, 1-aminobenzene-2-carboxylic acid ethyl ester, 1-aminobenzene-2-chloro-5-carboxylic acid methyl ester, 2-amino-5-nitrobenzoic acid methyl ester, 1-amino-2-methylbenzene-5-carboxylic acid methyl ester, 1-amino-2-chlorobenzene-5-carboxylic acid methylamide, 4-methyl-3-aminobenzoic acid amide, 4-chloro-3-aminobenzoic acid amide, 2,4-dichloro-5-aminobenzoic acid amide, 4-methoxy-3-aminobenzoic acid amide, 4-methyl-3-aminobenzoic acid-2'-chloro-5'-trifluoromethyl-anilide, 4-chloro-3-aminobenzoic acid-2',5'-dichloroanilide, 4-chloro-3-aminobenzoic acid-2'-chloro-5'-carbomethoxyanilide, 4-chloro-3-aminobenzoic acid-3'-chloroanilide, 2,4-dichloro-5-aminobenzoic acid-2',5'-dichloroanilide, 2,4-dichloro-5-aminobenzoic acid-3'-trifluoromethylanilide, 2,4-dichloro-5-aminobenzoic acid-3'-chloroanilide, 5-amino-4-methoxy-2-chlorobenzoic acid-3'-trifluoromethylanilide, 4-methoxy-3-aminobenzoic acid-3'-chloroanilide, 4-methoxy-3-aminobenzoic acid-2',5'-dichloroanilide, 4-carbomethoxy-3-aminobenzoic acid anilide, 4-methoxy-3-aminobenzoic acid-3'-trifluoromethyl-anilide, 4-carbethoxy-3-aminobenzoic acid-2',5'-dichloroanilide, 4-aminobenzoic acid-2',4'-dichlorophenylamide, 4-aminobenzoic acid-2'-chloro-5'-trifluoromethylphenylamide, 4-amino-3-methylbenzoic acid-3'-methylbenzoic acid-3'-trifluoromethylphenylamide, 4-amino-3-methylbenzoic acid-4'-chlorophenylamide, 4-amino-3-nitrobenzoic acid-2',5'-dichlorophenylamide, 1-aminobenzene-3-sulphonic acid amide, 1-aminobenzene-3-sulphonic acid methylamide, 1-aminobenzene-3-sulphonic acid ethylamide, 1-aminobenzene-3-sulphonic acid dimethylamide, 1-aminobenzene-3-sulphonic acid diethylamide, 1-aminobenzene-3-sulphonic acid phenylamide, 1-aminobenzene-3-sulphonic acid morpholide, 1-aminobenzene-3-sulphonic acid piperidide, 1-aminobenzene-4-sulphonic acid amide, 1-aminobenzene-4-sulphonic acid methylamide, 1-aminobenzene-4-sulphonic acid ethylamide, 1-aminobenzene-4-sulphonic acid dimethylamide, 1-aminobenzene-4-sulphonic acid diethylamide, 1-aminobenzene-4-sulphonic acid phenylamide, 1-aminobenzene-4-sulphonic acid-N-methyl-N-phenylamide, 1-amino-2-chlorobenzene-4-sulfonic acid amide, 1-amino-2-chlorobenzene-4-sulphonic acid methylamide, 1-amino-2-chlorobenzene-4-sulphonic acid dimethylamide, 1-amino-2-chlorobenzene-4-sulphonic acid diethylamide, 1-amino-2-chlorobenzene-4-sulphonic acid phenylamide, 1-amino-2-chlorobenzene-5-sulphonic acid dimethylamide, 1-amino-2-chlorobenzene-5-sulphonic acid diethylamide, 1-amino-2-chlorobenzene-5-sulphonic acid morpholide, 1-amino-2-chlorobenzene-5-sulphonic acid phenylamide, 1-amino-2,5-dichlorobenzene-4-sulphonic acid amide, 1-amino-2,5-dichlorobenzene-4-sulfonic acid dimethylamide, 1-amino-2,5-dichlorobenzene-4-sulphonic acid phenylamide, 1-amino-2-methylbenzene-5-sulphonic acid amide, 1-amino-2-methylbenzene-5-sulphonic acid methylamide, 1-amino-2-methylbenzene-5-sulphonic acid dimethylamide, 1-amino-2-methylbenzene-5-sulphonic acid phenylamide, 1-amino-2-methylbenzene-5-sulphonic acid piperidide, 1-amino-2-methylbenzene-5-sulphonic acid benzylamide, 1-amino-2-methylbenzene-5-sulphonic acid phenylamide, 1-amino-2-methylbenzene-5-sulphonic acid-N-methyl-N-phenylamide, 1-amino-2-methylbenzene-5-sulphonic acid-2'-chlorophenylamide, 1-amino-2-methylbenzene-5-sulphonic acid-4'-chlorophenylamide, 1-amino-2-methylbenzene-5-sulphonic acid-2',4'-dichlorophenylamide, 1-amino-2-methylbenzene-5-sulphonic acid-2'-methylphenylamide, 1-amino-2-methylbenzene-5-sulphonic acid-4'-methylphenylamide, 1-amino-2-methylbenzene-5-sulphonic acid-4'-methoxyphenylamide, 1-amino-2-methylbenzene-5-sulphonic acid-4'-chloro-2'-methylamide, 1-amino-2-methylbenzene-5-sulphonic acid-4'-chloro-3'-methylamide, 1-amino-2-methylbenzene-5-sulphonic acid-3'-trifluoromethylphenylamide, 1-amino-2-methylbenzene-4-sulphonic acid-4'-chloro-2'-methylphenylamide, 1-amino-2-methylbenzene-4-sulphonic acid-4'-phenylphenylamide, 1-amino-2-methylbenzene-4-sulphonic acid dimethylamide, 1-amino-2-methylbenzene-4-sulphonic acid diethylamide, 1-amino-3-methylbenzene-4-sulphonic acid dimethylamide, 1-amino-2-methylbenzene-4-sulphonic acid phenylamide, 1-amino-4-methylbenzene-5-sulphonic acid amide, 1-amino-4-methylbenzene-5-sulphonic acid dimethylamide, 1-amino-2-methoxybenzene-4-sulphonic acid amide, 1-amino-2-methoxybenzene-4-sulphonic acid methylamide, 1-amino-2-methoxybenzene-4-sulphonic acid dimethylamide, 1-amino-2-methoxybenzene-4-sulphonic acid phenylamide, 1-amino-2-methoxybenzene-4-sulphonic acid-4'-methylphenylamide, 1-amino-2-methoxybenzene-5-sulphonic acid amide, 1-amino-2-methoxybenzene-5-sulphonic acid dimethylamide, 1-amino-2-methoxybenzene-5-sulphonic acid phenylamide, 1-amino-2-phenoxybenzene-4-sulphonic acid amide, 1-amino-2-phenoxybenzene-4-sulphonic acid dimethylamide, 1-amino-2-phenoxybenzene-4-sulphonic acid phenylamide, 1-amino-2-phenoxybenzene-5-sulphonic acid amide, 1-amino-2-phenoxybenzene-5-sulphonic acid dimethylamide, 1-amino-2-phenoxybenzene-5-sulphonic acid phenylamide, 1-aminobenzene-2,4-disulphonic acid amide, 1-aminobenzene-2,4-disulphonic acid dimethylamide, 1-aminobenzene-2,5-disulphonic acid amide, 1-aminobenzene-2,5-disulphonic acid dimethylamide, 1-aminobenzene-2,5-disulphonic acid phenylamide, 1-aminonaphthalene, 1-amino-4-phenoxynaphthalene, 1-amino-8-chloronaphthalene, 1-aminonaphthalene-3-sulphonic acid amide, 1-aminonaphthalene-3-sulphonic acid methylamide, 1-aminonaphthalene-3-sulphonic acid dimethylamide, 1-aminonaphthalene-3-sulphonic acid phenylamide, 1-aminonaphthalene-4-sulphonic acid amide, 1-aminonaphthalene-4-sulphonic acid methylamide, 1-amino-naphthalene-4-sulphonic acid dimethylamide, 1-aminonaphthalene-4-sulphonic acid phenylamide, 1-aminonaphthalene-5-sulphonic acid amide, 1-aminonaphthalene-5-sulphonic acid dimethylamide, 1-aminonaphthalene-5-sulphonic acid phenylamide, 1-aminonaphthalene-6-sulphonic naphthalene-6-sulphonic acid amide, 1-aminonaphthalene-7-sulphonic acid amide, 2-aminonaphthalene, 2-aminonaphthalene-5-sulphonic acid amide, 2-aminonaphthalene-5-sulphonic acid dimethylamide, 2-aminonaphthalene-5-sulphonic acid phenylamide, 2-aminonaphthalene-6-sulphonic acid amide, 2-aminonaphthalene-6-sulphonic acid phenylamide, 2-aminonaphthalene-7-sulphonic acid amide, 2-aminonaphthalene-8-sulphonic acid amide, 2-aminonaphthalene-5,7-disulphonic acid amide, 2-aminonaphthalene-6,8-disulphonic acid amide, 1-aminoanthraquinone and 2-aminoanthraquinone.

The azo dyestuff carboxylic acids thus obtained are treated with substances that are capable of converting carboxylic acids into their halides, for example their chlorides or bromides, such substances being, in particular, phosphorus halides, for example, phosphorus pentachloride, phosphorus trichloride or phosphorus pentabromide, phosphorus oxyhalides and preferably thionyl chloride.

The treatment with the said acid halogenating agents is advantageously carried out in an inert organic solvent, for example, dimethylformamide, a chlorobenzene, for example, monochlorobenzene or dichlorobenzene, toluene, xylene or nitrobenzene. If necessary, dimethylformamide may be used in conjunction with the last five solvents specified. When preparing the carboxylic halides, it is generally advantageous first to dry the azo compounds, which are prepared in an aqueous medium, or to free them from water by azeotropic distillation in an organic solvent. If desired, azeotropic drying may be carried out immediately prior to the treatment with the said halogenating agents.

The azo dyestuff carboxylic acid halides obtained are condensed with diamines of the formula $$H_2N-R_3-NH_2$$

preferably with those of the formula

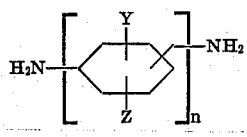

and particularly with those of the formula

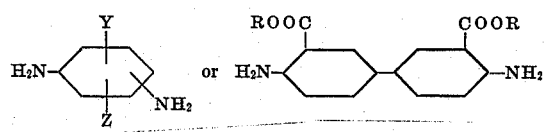

in which formulas $R_3$, Y, Z, n and R have the meanings given above.

The following diamines are given as examples: 3,5-diaminobenzoic acid methyl ester, 3,5-diaminobenzoic acid ethyl ester, 3,5-diaminobenzoic acid butyl ester, 3,5-diaminobenzoic acid phenyl ester, 3,5-diaminobenzoic acid-4'-chlorophenyl ester, 3,5-diaminobenzoic acid-2',4'-dichlorophenyl ester, 3,5-diaminobenzoic acid-2',4',5'-trichlorophenyl ester, 4-chloro-3,5-diaminobenzoic acid methyl ester, 4-chloro-3,5-diaminobenzoic acid ethyl ester, 4-chloro-3,5-diaminobenzoic acid propyl ester, 4-chloro-3,5-diaminobenzoic acid phenyl ester, 4-methyl-3,5-diaminobenzoic acid methyl ester, 4-methyl-3,5-diaminobenzoic acid ethyl ester, 4-methyl-3,5-diaminobenzoic acid phenyl ester, 4-methyl-3,5-diaminobenzoic acid-4'-methylphenyl ester, 4-methoxy-3,5-diaminobenzoic acid methyl ester, 4-methoxy-3,5-diaminobenzoic acid ethyl ester, 4-methoxy-3,5-diaminobenzoic acid isopropyl ester, 4-methoxy-3,5-diaminobenzoic acid phenyl ester, 4-methoxy-3,5-diaminobenzoic acid cyclohexyl ester, 4-phenoxy-3,5-diaminobenzoic acid methyl ester, 4-phenoxy-3,5-diaminobenzoic acid ethyl ester, 3,5-diaminobenzoic acid-β-naphthyl ester, 2-chloro-3,5-diaminobenzoic acid methyl ester, 2-chloro-3,5-diaminobenzoic acid ethyl ester, 2,5-diaminobenzoic acid methyl ester, 2,5-diaminobenzoic acid ethyl ester, 2,5-diaminobenzoic acid phenyl ester, 4-chloro-2,5-diaminobenzoic acid methyl ester, 4-chloro-2,5-diaminobenzoic acid ethyl ester, 4-chloro-2,5-diaminobenzoic acid butyl ester, 4-chloro-2,5-diaminobenzoic acid cyclohexyl ester, 4-methyl-2,5-diaminobenzoic acid methyl ester, 4-methyl-2,5-diaminobenzoic acid ethyl ester, 4-methyl-2,5-diaminobenzoic acid phenyl ester, 2,5-diaminobenzene-1,4-dicarboxylic acid methyl ester, 2,5-diaminobenzene-1,4-dicarboxylic acid ethyl ester, 2,5-diaminobenzene-1,4-dicarboxylic acid propyl ester, 2,6-diaminobenzene-1,4-dicarboxylic acid methyl ester, 2,6-diaminobenzene-1,4-dicarboxylic acid ethyl ester, 2,4-diaminobenzoic acid methyl ester, 2,4-diaminobenzoic acid ethyl ester, 2,4-diaminobenzoic acid propyl ester, 4,4'-diaminodiphenyl-carboxylic acid methyl ester, 4,4'-diaminodiphenyldicarboxylic acid ethyl ester, 4,4'-diaminodiphenyldicarboxylic acid propyl ester, 4,4'-diaminodiphenyldicarboxylic acid butyl ester, 3,5-diaminobenzoic acid amide, 3,5-diaminobenzoic acid methylamide, 3,5-diaminobenzoic acid ethylamide, 3,5-diaminobenzoic acid phenylamide, 3,5-diaminobenzoic acid anilide, 3,5-diaminobenzoic acid-(4'-methoxy)-anilide, 3,5-diaminobenzoic acid-(2',5'-dichloro)-anilide, 3,5-diaminobenzoic acid-(4'-chloro)-dianilide, 4-chloro-3,5-diaminobenzoic acid anilide, 4-methyl-3,5-diaminobenzoic acid anilide, 4-methoxy-3,5-diaminobenzoic acid anilide, 4-phenoxy-3,5-diaminobenzoic acid anilide, 2,5-diaminobenzoic acid amide, 2,5-diaminobenzoic acid methylamide, 2,5-diaminobenzoic acid ethylamide, 2,5-diaminobenzoic acid anilide, 4-chloro-2,5-diaminobenzoic acid anilide, 4-methyl-2,5-diaminobenzoic acid anilide, 2,5-diaminobenzene-1,4-dicarboxylic acid anilide, 3,5-diaminophenylmethylsulphone, 3,5-diaminodiphenylsulphone, 2,5-diaminophenylmethylsulphone, 2,5-diaminophenylethylsulphone, 2,5-diaminodiphenylsulphone, 3,5-diaminobenzenesulphonic acid methyl ester, 3,5-diaminobenzenesulphonic acid ethyl ester, 3,5-diaminobenzenesulphonic acid phenyl ester, 2,5-diaminobenzenesulphonic acid methyl ester, 2,5-diaminobenzenesulphonic acid ethyl ester, 2,5- diaminobenzenesulphonic acid phenyl ester, 3,4-diaminobenzenesulphonic acid anilide, 3,4-diaminobenzenesulphonic acid-(3'-trifluoromethyl)-anilide, 3,5-diaminobenzenesulphonic acid amide, 3,5-diaminobenzenesulphonic acid methylamide, 3,5-diaminobenzenesulphonic acid ethylamide, 3,5-diaminobenzenesulphonic acid dimethylamide, 3,5-diaminobenzenesulphonic acid diethylamide, 3,5-diaminobenzenesulphonic acid phenylamide, 2,5-diaminobenzenesulphonic acid amide, 2,5-diaminobenzenesulphonic acid methylamide, 2,5-diaminobenzenesulphonic acid ethylamide, 2,5-diaminobenzenesulphonic acid dimethylamide, 2,5-diaminobenzenesulphonic acid phenylamide and 2-(4'-methyl)-phenylsulphonyl-1,4-diaminobenzene.

Condensation between the carboxylic acid halides defined above and the amines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chlorides obtained from the carboxylic acids. In some cases, however, isolation of the acid chlorides may be omitted without harm and condensation may be carried out immediately after preparation of the carboxylic acid chlorides.

The new products are valuable pigments that may be used in a finely divided form for the coloration of organic materials of high molecular weight, for example, cellulose ethers, cellulose esters, polyamides, polyurethanes, polyesters, cellulose acetate, nitrocellulose, natural resins and synthetic resins, for example, polymerization resins or condensation resins, for example, aminoplasts, especially urea-formaldehyde and melamine-formaldehyde resins, alkyd resins, phenoplasts, polycarbonates, polyolefines, for example, polyethylene, polypropylene, polystyrene, polyvinyl chloride, polyacrylonitrile, polyacrylic acid esters, rubber, casein, and also for silicones and silicone resins. The pigments may be used single or in admixture with one another.

It is immaterial whether the compounds of high molecular weight specified above are used in the form of plastic compositions, melts, spinning solutions, lacquers or printing inks. Depending on the use, it is advantageous to use the new pigments as toners or in the form of preparations.

The following Examples illustrate the invention, the parts and percentages being by weight, unless otherwise stated.

EXAMPLE 1

36.1 Parts of the dyestuff obtained by coupling diazotized 2,5-dichloroaniline with 2,3-hydroxynaphthoic acid are treated for 3 hours at 110° to 120°C with 15 parts of thionyl chloride in 150 parts by volume of dichlorobenzene. The dyestuff acid chloride, which crystallizes in the form of shiny red needles after the batch has cooled, is isolated by filtration, washed successively with benzene and petroleum ether and then dried in vacuo at 40° to 45°C. About 34 parts of the chloride are obtained, corresponding to 89.7 percent of the theoretical yield.

7.6 Parts of the dyestuff acid chloride so obtained are mixed with 250 parts of ortho-dichlorobenzene and then a solution of 3.0 parts of 4,4'-diaminodiphenyl-3,3'-dicarboxylic acid dimethyl ester in 100 parts of ortho-dichlorobenzene and 0.2 part of pyridine is added at room temperature. The batch is then heated to 140° to 145°C during 2 hours and then stirred for 6 hours at that temperature. The batch is then allowed to cool to 100°C, whereupon it is filtered and the filter residue is washed with ortho-dichlorobenzene having a temperature of 120°C until the filtrate runs colorless. The filter residue is then washed successively with methanol and hot water, and dried in vacuo at 90° to 100°C. 9.5 Parts (96.4 percent of the theoretical yield) of an orange pigment of the formula

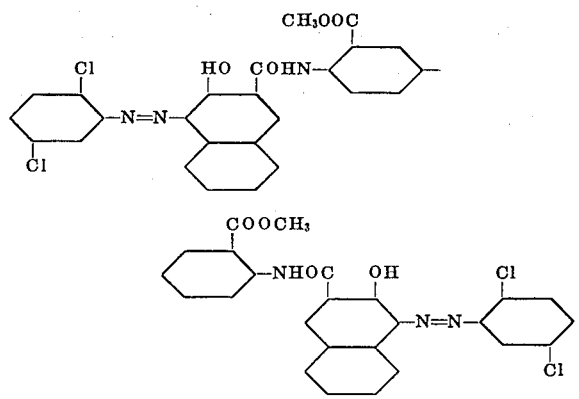

are obtained. When the pigment is worked into polyvinyl chloride on a roller mill, it yields a brilliant orange coloration of high tinctorial strength and possessing excellent fastness to migration and light.

The 4,4'-diaminodiphenyl-3,3'-dicarboxylic acid dimethyl ester used in this Example may be obtained in the following manner:

200 Parts of sulphuric acid monohydrate are cooled to 0°C and then 54.4 parts of 4,4'-diaminodiphenyl-3,3'-dicarboxylic acid are introduced at 0°C while stirring. Dissolution first occurs, and then the sulphate precipitates after a short time in the form of grey crystals. 200 Parts of methanol are then run into the slurry of crystals, which can easily be stirred, without external cooling, in a manner such that the mixture, which heats up rapidly, just begins to reflux. The batch is then refluxed for 14 hours while stirring. The mobile reaction mixture is then cooled to room temperature, discharged on to 500 parts of ice, neutralized to pH 7 with sodium hydroxide solution at 0°C, the pH is then adjusted to 10 with a 10 percent sodium carbonate solution, and the batch is filtered. The precipitate is washed with cold water until the washings run neutral and then dried in vacuo at 60° to 70°C. This procedure yields 54 parts (90 percent of the theoretical yield) of 4,4'-diaminodiphenyl-3,3'-dicarboxylic acid dimethyl ester in the form of a light fawn powder melting at 187° to 190°C. A single recrystallization from methanol is carried out and the compound is obtained in the form of small, pale yellow needles melting at 190° to 191°C.

The following Table lists components for making further pigments. They can be obtained in the manner described above by coupling the diazo bases listed in column I with 2,3-hydroxynaphthoic acid, converting the azo dyestuff carboxylic acids so obtained into their acid chlorides, and then condensing the latter with the diamines given in column II. The shades that the pigments yield in polyvinyl chloride film are indicated in column III.

| | I | II | III |
|---|---|---|---|
| 1 | 2,5-dichloroaniline | benzidine-3,3'-dicarboxylic acid diethyl ester | yellowish orange |
| 2 | " | benzidine-3,3'-dicarboxylic acid dibutyl ester | " |
| 3 | 2,4,5-trichloroaniline | benzidine-3,3'-dicarboxylic acid dimethyl ester | scarlet |
| 4 | " | benzidine-3,3'-dicarboxylic acid diethyl ester | reddish orange |
| 5 | " | benzidine-3,3'-dicarboxylic acid dibutyl ester | orange |
| 6 | 2,4-dichloroaniline | benzidine-3,3'-dicarboxylic acid dimethyl ester | yellowish red |
| 7 | " | benzidine-3,3'-dicarboxylic acid diethyl ester | red |
| 8 | 2,4,6-trichloroaniline | benzidine-3,3'-dicarboxylic acid dimethyl ester | " |
| 9 | 2,5-dibromoaniline | benzidine-3,3'-dicarboxylic acid dimethyl ester | reddish orange |
| 10 | 2-chloro-5-trifluoromethylaniline | benzidine-3,3'-dicarboxylic acid dimethyl ester | yellowish orange |
| 11 | " | benzidine-3,3'-dicarboxylic acid dibutyl ester | orange |
| 12 | 4-chloro-3-trifluoromethylaniline | benzidine-3,3'-dicarboxylic acid dibutyl ester | " |
| 13 | 4-trifluoromethyl-2-nitroaniline | " | yellowish orange |
| 14 | 2-trifluoromethyl-4-nitroaniline | " | scarlet |
| 15 | 4-trifluoromethyl-2-amino-4'-chlorodiphenyl-ether | " | orange |
| 16 | 2-methyl-5-chloroaniline | benzidine-3,3'-dicarboxylic acid dibutyl ester | red |
| 17 | " | benzidine-3,3'-dicarboxylic acid dimethyl ester | " |
| 18 | 2-methyl-3-chloroaniline | " | " |
| 19 | 5-nitro-2-methoxyaniline | " | bluish red |
| 20 | 4-trifluoromethyl-2-aminobenzene-1-ethyl-sulphone | " | yellowish orange |
| 21 | dichloroaniline | 2,5-diaminobenzoic acid ethyl ester | orange |
| 22 | 2-chloro-5-trifluoromethylaniline | " | scarlet |
| 23 | 2-methyl-3-chloroaniline | 2,5-diaminobenzoic acid ethyl ester | red |
| 24 | 2-methyl-4-chloroaniline | " | " |
| 25 | 5-nitro-2-methoxyaniline | 2,5-diaminobenzoic acid methyl ester | " |
| 26 | 2-nitro-4-trifluoromethylaniline | " | " |
| 27 | 2,5-dichloroaniline | 3,5-diaminobenzoic acid methyl ester | scarlet |
| 28 | 2,4,5-trichloroaniline | " | " |
| 29 | 2-chloro-5-trifluoromethylaniline | " | yellowish red |
| 30 | 2-nitro-4-trifluoromethylaniline | " | orange |
| 31 | 4-trifluoromethyl-2-aminobenzene-1-methyl-sulphone | " | yellowish orange |
| 32 | 2-methyl-3-chloroaniline | " | scarlet |
| 33 | 2,4-dichloroaniline | " | red |
| 34 | 5-nitro-2-methoxyaniline | " | " |
| 35 | 2,4-dichloroaniline | 3,5-diaminobenzoic acid ethyl ester | " |
| 36 | 2,4,5-trichloroaniline | " | scarlet |
| 37 | 2-chloro-5-trifluoromethylaniline | " | reddish orange |
| 38 | 4-trifluoromethyl-2-nitroaniline | " | orange |
| 39 | 2,5-dichloroaniline | 4-methyl-3,5-diaminobenzoic acid methyl ester | scarlet-red |
| 40 | 2,4,5-trichloroaniline | " | red |
| 41 | 2,4-dichloroaniline | " | " |
| 42 | 4-trifluoromethyl-2-amino-4'-chlorodiphenyl ether | " | scarlet |
| 43 | 3-chloro-5-trifluoromethylaniline | " | orange |
| 44 | 2,5-dichloroaniline | 4-methyl-3,5-diaminobenzoic acid ethyl ester | scarlet |
| 45 | " | 4-methyl-3,5-diaminobenzoic acid butyl ester | " |
| 46 | " | 4-methyl-3,5-diaminobenzoic acid phenyl ester | red |
| 47 | " | 4-chloro-3,5-diaminobenzoic acid ethyl ester | yellowish red |
| 48 | 2,5-dichloroaniline | 4-methoxy-3,5-diaminobenzoic acid ethyl ester | bluish red |
| 49 | " | 4-chloro-2,5-diaminobenzoic acid ethyl ester | orange |
| 50 | " | 4-methyl-2,5-diaminobenzoic acid ethyl ester | scarlet |
| 51 | " | 2,5-diaminobenzene-1,4-dicarboxylic acid diethyl ester | orange |
| 52 | " | 2,6-diaminobenzene-1,4-dicarboxylic acid diethyl ester | " |
| 53 | 2,4,5-trichloroaniline | 4-methyl-3,5-diaminobenzoic acid aniline | scarlet |
| 54 | 2-nitro-4-chloroaniline | " | bluish red |
| 55 | 2-amino-4-trifluoromethylbenzene-ethyl-sulphone | " | orange |
| 56 | 4-trifluoromethyl-2-amino-4'-chlorodiphenyl-ether | " | brilliant scarlet |
| 57 | 2,5-dichloroaniline | 4-methoxy-3,5-diaminobenzoic acid anilide | red |
| 58 | " | 4-chloro-3,5-diaminobenzoic acid-4'-chloro-anilide | scarlet |
| 59 | " | 2,5-diaminobenzoic acid anilide | red |
| 60 | " | 2,5-diaminobenzoic acid-4'-chloroanilide | " |
| 61 | aniline | 3,5-diaminobenzoic acid anilide | brilliant orange |
| 62 | 2,4,5-trichloroaniline | 3,5-diaminobenzoic acid-(4'-methoxy)-anilide | " |
| 63 | " | 3,5-diaminobenzoic acid-(2',5'-dichloro)-anilide | orange |
| 64 | " | 3,4-diaminobenzoic acid-(4'-chloro)-anilide | scarlet |
| 65 | " | 3,4-diaminobenzene sulphonic acid-(3'-trifluoromethyl)-anilide | " |
| 66 | 4-trifluoromethyl-2-nitroaniline | 3,5-diaminobenzoic acid-(2',5'-dichloro)-anilide | yellowish orange |
| 67 | " | 3,5-diaminobenzoic acid anilide | " |
| 68 | 4-methyl-3-aminobenzoic acid methyl ester | 3,5-diaminobenzoic acid anilide | scarlet |
| 69 | " | 3,5-diaminobenzoic acid-(2',5'-dichloro)-anilide | " |
| 70 | " | 3,5-diaminobenzoic acid-(4'-methoxy)-anilide | brilliant orange |
| 71 | " | 3,4-diaminobenzoic acid-(4'-chloro)-anilide | red |
| 72 | 4-methyl-3-aminobenzoic acid-(4'-methyl)-phenyl ester | 3,5-diaminobenzoic acid-(2',5'-dichloro)-anilide | brilliant orange |
| 73 | 4-methyl-3-aminobenzoic acid-β-naphthyl ester | 3,5-diaminobenzoic acid anilide | scarlet |
| 74 | " | 4-methyl-3,5-diaminobenzoic acid methyl ester | bluish red |

| | | | |
|---|---|---|---|
| 75 | 4-methyl-3-aminobenzoic acid-(4′-methyl)-phenyl ester | " | brilliant bluish red |
| 76 | 4-methyl-3-aminobenzoic acid methyl ester | " | scarlet |
| 77 | 2,5-dichloroaniline | benzidine-3,3′-dicarboxylic acid diamide | orange |
| 78 | 2,4,5-trichloroaniline | " | yellowish brown red |
| 79 | 4-methoxy-3-aminobenzoic acid methyl ester | " | " |
| 80 | 2-chloro-5-trifluoromethylaniline | 3,5-diaminobenzoic acid amide | orange |
| 81 | " | 2,5-diaminobenzoic acid anilide | scarlet |
| 82 | 2,5-dichloroaniline | 2,5-diaminobenzoic acid dimethylamide | red |
| 83 | " | 3,5-diaminobenzene sulphonic acid amide | scarlet |
| 84 | " | 3,5-diaminobenzene sulphonic acid methylamide | " |
| 85 | " | 3,5-diaminobenzene sulphonic acid anilide | " |
| 86 | 2,4,5-trichloroaniline | 3,5-diaminobenzoic acid -β-naphthyl ester | reddish orange |
| 87 | " | 3,5-diaminobenzoic acid -2′,4′,5′-trichloroanilide | " |
| 88 | 4-trifluoromethyl-2-nitroaniline | 3,5-diaminobenzoic acid -2′-chloro-5′-trifluoromethyl-anilide | yellowish orange |
| 89 | " | 3,5-diaminobenzoic acid -2′,4′,5′-trichloroanilide | " |
| 90 | 2-amino-4-trifluoromethyl-4′-chloro-diphenyl ether | benzidine-3,3′-dicarboxylic acid-dimethyl ester | orange |
| 91 | 2-amino-4-trifluoromethyl-diphenyl ether | " | " |
| 92 | 2-amino-4-trifluoromethy-2′,4′-dichloro-diphenyl ether | " | " |
| 93 | 2-amino-4-trifluoromethyl-2′,4′,5′ ether | " | " |
| 94 | 2-amino-4-trifluoromethyl-2′-methyl-diphenyl ether | " | " |
| 95 | 2-amino-4-trifluoromethyl-4′-methyl-diphenyl ether | " | " |
| 96 | 2-amino-4-trifluoromethyl-4′-tert.-butyl-diphenyl ether | " | " |
| 97 | 4-amino-2-trifluoromethyl-diphenyl ether | " | scarlet |
| 98 | 4-amino-2-trifluoromethyl-4-chloro diphenyl ether | " | " |

EXAMPLE 2

19.8 Parts of the dyestuff carboxylic acid obtained by coupling diazotized 3-amino-4-chlorobenzotrifluoride with 2,3-hydroxynaphthoic acid are heated for 30 minutes at 130° to 140°C in 200 parts by volume of chlorobenzene together with 7.1 parts by volume of thionyl chloride. The solution so obtained is allowed to cool and the dyestuff carboxylic acid chloride crystallizes out in the form of needles. The product is isolated by filtration and dried in vacuo, the yield being 15.1 parts.

4.13 Parts of the acid chloride are heated for 12 hours at 130° to 140°C in 150 parts by volume of orthodichlorobenzene together with 1.3 parts of the dichlorohydrate of 2-methylsulphonyl-1,4-diaminobenzene and 1.4 parts by volume of triethylamine. A pigment is obtained in the form of fine crystals. It is isolated by filtration while hot, washed successively with hot ortho-dichlorobenzene, methanol and water and then dried. The pigment colors polyvinyl chloride a yellowish red shade possessing very good fastness to migration and good fastness to light. It has the formula

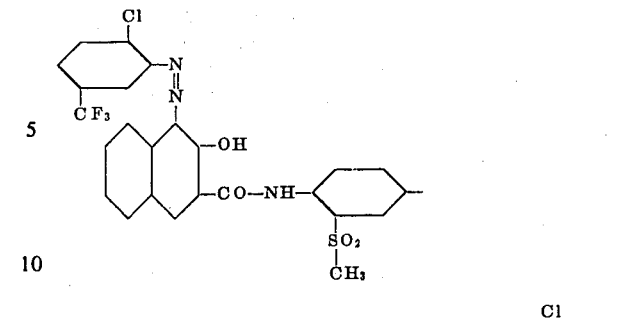

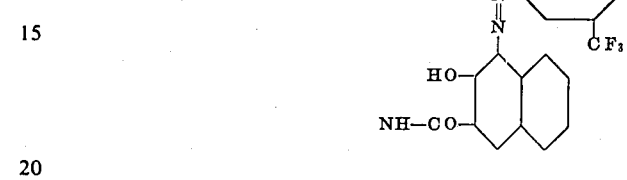

The following Table lists components for making further pigments. They can be obtained in the manner described above by coupling the diazo bases listed in column I with 2,3-hydroxynaphthoic acid, converting the azo dyestuff carboxylic acids so obtained into their acid chlorides, and then condensing the latter with the diamines given in column II. The shades that the pigments yield in polyvinyl chloride film are indicated in column III.

| | I | II | III |
|---|---|---|---|
| 1 | 2,5-dichloro-1-aminobenzene | 2-methylsulphonyl-1,4-diaminobenzene | scarlet |
| 2 | 2,4,5-trichloro-1-aminobenzene | " | brownish orange |
| 3 | 2-chloro-4-methylsulphonyl-1-diaminobenzene | " | scarlet |
| 4 | 2-ethylsulphonyl-5-trifluoromethyl-1-aminobenzene | " | orange |
| 5 | 2-methoxy-5-benzyl-sulphonyl-1-aminobenzene | " | scarlet |
| 6 | 4-methyl-3-aminobenzoic acid methyl ester | 2-(4′-methyl)-phenyl-sulphonyl-1,4-diaminobenzene | orange |
| 7 | 4-methyl-3-aminobenzoic acid-β-naphthyl ester | " | " |
| 8 | 2,4,5-trichloro-1-aminobenzene | " | reddish orange |
| 9 | 2,5-dichloro-1-aminobenzene | " | scarlet |
| 10 | 2-chloro-5-trifluoromethyl-aniline | " | orange |
| 11 | 4-trifluoromethyl-2-nitro-aniline | " | brown |

EXAMPLE 3

The following Table lists components for making further pigments. They may be obtained in the manner described above by coupling the diazo bases listed in column I with the hydroxynaphthoic acid listed in column II, converting the azo dyestuff carboxylic acids so obtained into their acid chlorides and then condensing the latter with the diamines listed in column III. The shades that the pigments yield in polyvinyl chloride film are indicated in column IV.

| | I | II | III | IV |
|---|---|---|---|---|
| 1 | 2,5-dichloro-aniline | 6-bromo-2,3-hydroxy-naphthoic acid | benzidine-3,3′-dicarboxylic acid dimethyl ester | scarlet |
| 2 | " | 6-methoxy-2,3-hydroxy-naphthoic acid | benzidine-3,3′-dicarboxylic acid diethyl ester | red |

| | | | | |
|---|---|---|---|---|
| 3 | " | " | 2,5-diamino-benzoic acid anilide | claret |
| 4 | " | 6-nitro-2,3-hydroxy-naphthoic acid | benzidine-3,3'-dicarboxylic acid dimethyl ester | red |
| 5 | " | 6-cyano-2,3-hydroxy-naphthoic acid | " | " |

We claim:
1. A disazo pigment of the formula

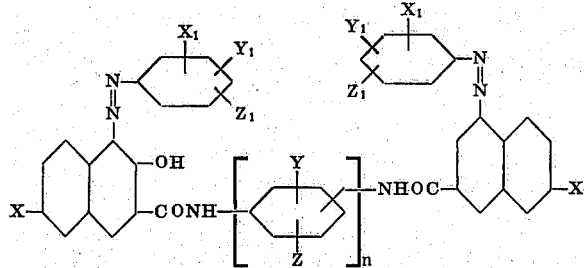

in which $X_1$ and $Y_1$ each represents hydrogen, chloro, bromo, lower alkyl, lower alkoxy, phenoxy, chlorophenoxy, loweralkyl phenoxy, nitro, cyano, lower carbalkoxy, carbophenoxy, carbochlorophenoxy, carbo-lower alkyl-phenoxy, carbonaphthoxy, lower alkyl-sulfonyl, or trifluoromethyl, $Z_1$ is hydrogen, chloro, bromo, lower alkyl, or lower alkoxy, X represents hydrogen, bromo, lower alkoxy, cyano or nitro, Y is lower carbalkoxy, carbophenoxy, carbochlorophenoxy, carbo-lower alkyl-phenoxy, carbonaphthoxy, sulfonic acid-lower alkyl ester, carboxylic acid amide, carboxylic acid-lower-alkyl amide, carboxylic acid-phenyl-amide, carboxylic acid-chlorophenyl amide, carboxylic acid-lower alkyl-phenyl amide, carboxylic acid-trifluoromethyl-phenyl amide, sulfonic acid amide, sulfonic acid-lower alkyl amide, sulfonic acid-phenyl-amide, sulfonic acid-chloro-phenyl amide, sulfonic acid-lower alkyl-phenyl amide, or lower alkyl sulfonyl, Z is hydrogen, chloro, lower alkyl or lower alkoxy and $n$ is 1 or 2.

2. A disazo pigment, as claimed in claim 1 of the formula

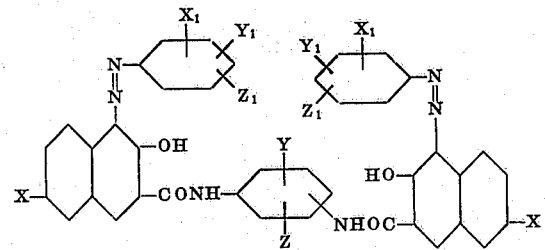

in which $X_1$, $Y_1$, $Z_1$, X, Y and Z have the meanings given in claim 1.

3. A disazo pigment as claimed in claim 1 of the formula

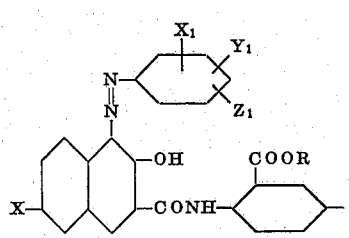

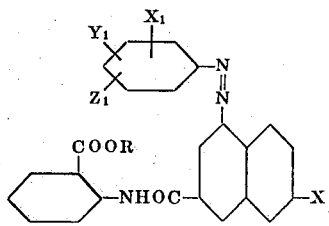

in which X, $X_1$, $Y_1$ and $Z_1$ have the meanings given in claim 2 and R represents a lower alkyl group.

4. The compound as claimed in claim 1 of the formula

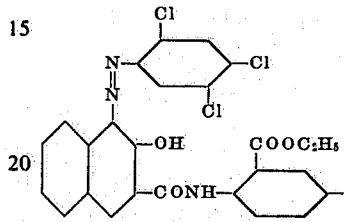

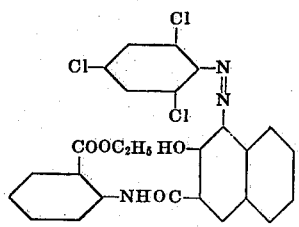

5. The compound as claimed in claim 1 of the formula

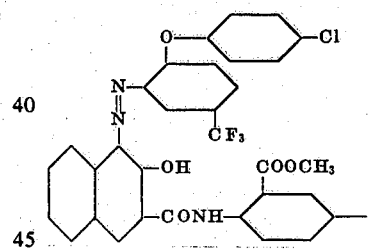

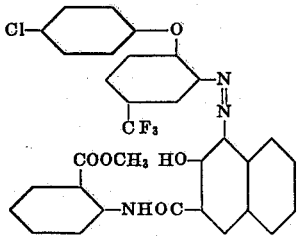

6. The compound as claimed in claim 1 of the formula

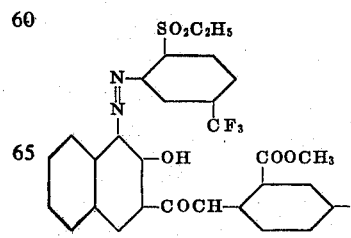

7. The compound as claimed in claim 1 of the formula
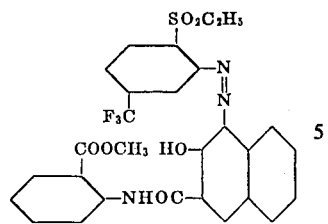
8. The compound as claimed in claim 1 of the formula
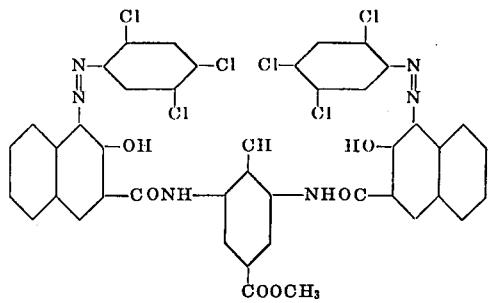
9. The compound as claimed in claim 1 of the formula
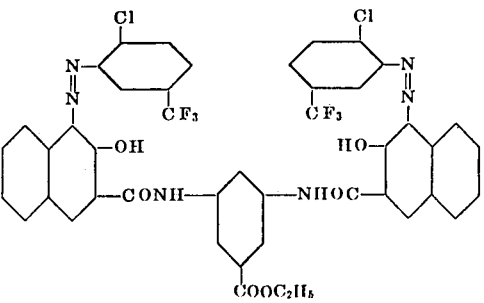
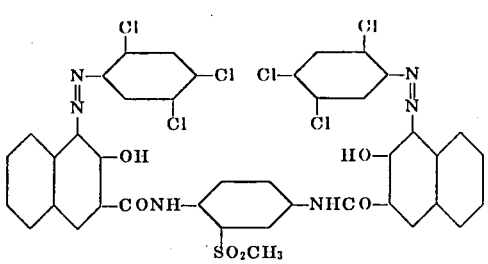
* * * * *